United States Patent [19]

Nakagawa et al.

[11] Patent Number: 5,250,349
[45] Date of Patent: Oct. 5, 1993

[54] RETORTABLE PACKAGING LAMINATE STRUCTURE WITH ADHESIVE LAYER

[75] Inventors: Mikio Nakagawa; Masaharu Mito, both of Waki, Japan

[73] Assignee: Mitsui Petrochemical Industries, Ltd., Tokyo, Japan

[21] Appl. No.: 908,991

[22] Filed: Jul. 6, 1992

Related U.S. Application Data

[62] Division of Ser. No. 563,351, Aug. 7, 1990, abandoned.

[30] Foreign Application Priority Data

Aug. 7, 1989 [JP] Japan ................... 1-204508
Sep. 19, 1989 [JP] Japan ................... 1-242775

[51] Int. Cl.$^5$ .............. B32B 27/36; B32B 7/12; C08F 255/02; C08L 23/04
[52] U.S. Cl. ..................... 428/212; 428/218; 428/412; 428/458; 428/462; 428/463; 428/518; 428/483; 428/520; 525/71; 525/74; 426/127
[58] Field of Search ........... 428/412, 458, 462, 463, 428/332, 518, 520, 483, 212, 218; 525/71, 74

[56] References Cited

U.S. PATENT DOCUMENTS 4,298,712 11/1981 Machonis, Jr. et al. ............ 525/74
4,304,881 12/1981 Aoki et al. ............ 525/66
4,554,304 11/1985 Hansen et al. ............ 524/291
4,762,882 8/1988 Okano et al. ............ 525/74

FOREIGN PATENT DOCUMENTS 0188901 7/1986 European Pat. Off. .
0203425 12/1986 European Pat. Off. .
840132898 1/1986 Japan .
61-296044 12/1986 Japan .
296044 12/1986 Japan .
1-045445 2/1989 Japan .
2107325 4/1983 United Kingdom .

Primary Examiner—P. C. Sluby
Attorney, Agent, or Firm—Sherman and Shalloway

[57] ABSTRACT

An adhesive resin composition comprising an ethylene/vinyl acetate copolymer, a styrene polymer resin, graft-modified polyethylene, a polystyrene elastomer and an ethylene/α-olefin copolymer in combination is disclosed. This adhesive resin composition shows an excellent adhesiveness between a metal and a thermoplastic resin. When this adhesive resin composition is used for bonding a polyester resin and a gas-barrier resin, a good bonding which is not degraded even by high-temperature heating can be attained.

6 Claims, No Drawings

RETORTABLE PACKAGING LAMINATE STRUCTURE WITH ADHESIVE LAYER

This is a division of Application Ser. No. 07/563,351 filed Aug. 7, 1990, now abandoned.

BACKGROUND OF THE INVENTION

(1) Field of the Invention

The present invention relates to an adhesive resin composition and a laminate comprising this resin composition as an adhesive layer. More particularly, the present invention relates to an adhesive resin composition giving an excellent adhesiveness between a metal and a thermoplastic resin, and a metal/resin sheath laminate to be used for a laminate sheath cable, which is formed by using this resin composition. Furthermore, the present invention relates to an adhesive resin composition, of which the adhesive force is not reduced even under contact with high-temperature water, and a laminate having an excellent gas-barrier property and being capable of resisting a retort treatment, which is formed by using this adhesive resin composition.

(2) Description of the Related Art

An adhesive resin composition comprising three components, that is, a styrene resin, an ethylene/vinyl acetate copolymer resin and a polyethylene resin graft-modified with an unsaturated carboxylic acid or a derivative thereof has been publicly known. This adhesive resin composition has an excellent adhesiveness between a metal and a thermoplastic resin and also between a polyester resin and an ethylene/vinyl acetate copolymer, which are used for a packaging material or the like to be subjected a retort treatment.

This adhesive resin composition is used for a laminate sheath cable having a resin sheath arranged on the outer side of a barrier material for a cable and a cable core, and since this laminate sheath cable is excellent in such characteristics as mechanical properties, corrosion resistance and moisture resistance, this cable is widely used at the present. In this laminate sheath cable, the above-mentioned adhesive resin composition is used for bonding a metal tape composed of aluminum, copper or the like, to be used as the barrier layer, to a sheath resin composed mainly of low-density polyethylene.

The laminate metal tape is generally prepared by extrusion lamination of a metal and a sheath resin or bonding a metal layer to a fusion-bonding resin layer film and a sheath resin layer film. In case of conventional fusion-bonding resins, streaks are often formed on the laminated fusion-bonding resin layer.

These streaks are formed because of local changes of the thickness of the fusion-bonding resin layer and the presence of these streaks degrades the adhesion between the metal and sheath resin and reduces the appearance characteristics of the product. Moreover, cracks are formed in a thin portion of the fusion-bonding resin layer and even the performances of the product are reduced.

In (Japanese Unexamined Patent Publication No. 61-296044, we previously proposed a thermoplastic resin composition capable of preventing formation of streaks in the fusion-bonding resin layer, which comprises 97 to 45 parts by weight of an ethylene/vinyl acetate copolymer, 30 to 1 parts by weight of a styrene polymer resin, 15 to 1 parts by weight of polyethylene graft-modified with an unsaturated carboxylic acid or a derivative thereof and 30 to 1 parts by weight of a monovinyl aromatic hydrocarbon/olefin block copolymer. When a laminate metal tape is prepared by using this thermoplastic resin composition as the fusion-bonding resin, streaks are not formed in the fusion bonding resin layer, but the adhesiveness between the metal and a resin sheath layer is not completely satisfactory.

Accordingly, development of an adhesive resin composition which can prevent formation of streaks in the fusion-bonding (adhesive) resin layer and can give an excellent adhesiveness between a metal and a resin sheath layer is eagerly desired.

Although the above-mentioned adhesive resin composition is used for the production of a laminate of a polyester resin and a gas-barrier resin to be used for a packaging vessel or the like and shows a good adhesiveness, if a heat treatment such as a high-temperature filling treatment or a retort treatment is carried out at the production of this laminate or at the time of eating or drinking a content in the packaging vessel, the adhesive force is sometimes reduced by heating, resulting in peeling of the layer and reduction of the gas permeation resistance.

As the adhesive resin composition capable of retaining a high adhesive force between layers of a laminate even after a high-temperature treatment such as a high-temperature filling treatment or a retort treatment, we previously proposed in Japanese Unexamined Patent Publication No. 64-45445 an adhesive resin composition comprising (a) 95 to 50% by weight of an ethylene/$\alpha$-olefin copolymer having a melt flow rate of 0.1 to 50 g/10 min, a density of 0.850 to 0.900 g/cm$^3$, an ethylene content of 75 to 95 mole % and an X-ray crystallinity lower than 30%, (b) 5 to 50% by weight of an ethylene/vinyl acetate copolymer having a melt flow rate of 0.1 to 50 g/10 min and a vinyl acetate content of 5 to 40% by weight, and (c) 1.0 to 30% by weight, based on the sum of components (a) and (b), of partially or wholly graft-modified polyethylene having a grafting amount of an unsaturated carboxylic acid or a derivative thereof of 0.05 to 15% by weight, a melt flow rate of 0.1 to 50 g/10 min, a density of 0.900 to 0.980 g/cm$^3$ and an X-ray crystallinity of at least 30%, wherein the grafting ratio of the composition as a whole is 0.01 to 3% by weight, the melt flow rate of the composition as a whole is 0.1 to 50 g/10 min and the crystallinity of the composition as a whole is lower than 35%. In this patent publication, we also proposed a laminate comprising a polyester or polycarbonate layer, an intermediate layer composed of this adhesive resin composition and a saponified olefin/vinyl acetate copolymer layer.

The above-mentioned adhesive resin composition has an excellent adhesiveness at normal temperature after a high-temperature treatment, but interlaminar peeling is sometimes caused in the above-mentioned laminate during a high-temperature filling treatment or a retort treatment.

Accordingly, development of an adhesive resin composition capable of completely preventing occurrence of interlaminar peeling in a laminate even under a high-temperature filling treatment or a retort treatment is desired.

SUMMARY OF THE INVENTION

The present invention is to solve the above-mentioned problems of the conventional techniques, and it is a primary object of the present invention to provide an adhesive resin composition capable of preventing formation of streaks in a fusion-bonding resin layer and giving an excellent adhesiveness between a metal and a thermoplastic resin sheath layer, and a laminate formed by using this adhesive resin composition.

Another object of the present invention is to provide an adhesive resin composition having such an excellent heat-resistant adhesiveness at a high temperature that occurrence of interlaminar peeling in a laminate can be completely prevented even during a severe treatment such as a high-temperature filling treatment or a retort treatment, while maintaining a practical adhesion strength at normal temperature after a high-temperature treatment.

Still another object of the present invention is to provide a laminate having an excellent gas permeation resistance and not causing interlaminar peeling at a high-temperature filling treatment or a retort treatment, which is formed by bonding a polycarbonate layer or polyalkylene terephthalate layer and a saponified ethylene/vinyl acetate copolymer layer by using an adhesive resin composition as set forth above.

A first adhesive resin composition having an excellent adhesiveness between a metal and a thermoplastic resin sheath layer according to the present invention comprises (a) 96 to 45 parts by weight of an ethylene/vinyl acetate copolymer, (b) 30 to 1 parts by weight of a styrene polymer resin, (c) 15 to 1 parts by weight of polyethylene graft-modified with an unsaturated carboxylic acid or a derivative thereof, (d) 20 to 1 parts by weight of a monovinyl aromatic hydrocarbon/olefin block copolymer elastomer and (e) an ethylene/α-olefin copolymer, the total amount of components (a), (b), (c), (d) and (e) being 100 parts by weight.

A first laminate formed by using the above-mentioned first adhesive resin composition according to the present invention comprises a layer of a metal such as aluminum, copper or iron, a layer of a thermoplastic resin such as a polyamide, a saponified ethylene/vinyl acetate copolymer, polyethylene or a polyester, and a layer of the first adhesive resin interposed between the two layers.

The second adhesive resin composition of the present invention, which has an excellent adhesiveness between a polyester resin such as a polyalkylene terephthalate or a polycarbonate and a gas-barrier resin such as a saponified ethylene/vinyl acetate copolymer, includes the following four embodiments.

An adhesive composition of the first embodiment comprises 100 parts by weight of partially or wholly graft-modified polyethylene in which a grafting amount of an unsaturated carboxylic acid or a derivative thereof is 0.05 to 15% by weight, the soft polymer being a styrene elastomer.

An adhesive resin composition of the second embodiment comprises 100 parts by weight of a soft polymer and 1 to 30 parts by weight of partially or wholly graft-modified polyethylene in which a grafting amount of an unsaturated carboxylic acid or a derivative thereof is 0.05 to 15% by weight, the soft polymer comprising (a) 20 to 100% by weight of a styrene elastomer and (b) 80 to 0% by weight of an ethylene/αolefin copolymer having an ethylene content of 45 to 95 mole %.

An adhesive resin composition of the third embodiment comprises 100 parts by weight of a soft polymer and 1 to 30 parts by weight of partially or wholly graft-modified polyethylene in which a grafting amount of an unsaturated carboxylic acid or a derivative thereof is 0.05 to 15% by weight, the soft polymer comprising (a) 20 to 100% by weight of an ethylene/vinyl acetate copolymer having a vinyl acetate content of 5 to 40% by weight.

An adhesive resin composition of the fourth embodiment comprises 100 parts by weight of a soft polymer and 1 to 30 parts by weight of partially or wholly graft-modified polyethylene in which a grafting amount of an unsaturated carboxylic acid or a derivative thereof is 0.05 to 15% by weight, the soft polymer comprising (a) 20 to 100% by weight of a styrene elastomer, (b) 0 to 80% by weight of an ethylene/α-olefin copolymer having an ethylene content of 45 to 95 mole % and (c) 0 to 80% by weight of an ethylene/vinyl acetate copolymer having a vinyl acetate content of 5 to 40% by weight.

The laminate of the present invention formed by the second adhesive resin composition includes the following two embodiments.

A laminate of the first embodiment comprises (I) a polyalkylene terephthalate resin layer, (II) an adhesive layer composed of a second adhesive resin composition as set forth above and (III) a saponified olefin/vinyl acetate copolymer layer.

A laminate of the second embodiment comprises (I) a polycarbonate resin layer, (II) an adhesive layer composed of a second adhesive resin composition as set forth above and (III) a saponified olefin/vinyl acetate copolymer layer.

Laminates of the first and second embodiments are prepared by melting the respective resins independently in different extruders, feeding the melts to a die having a three-layer structure and co-extruding them so that the adhesive resin composition is interposed between the two other resin layers, or by forming layers of two resins other than the adhesive resin composition in advance and melt-extruding the adhesive resin composition between the two layers.

DETAILED DESCRIPTION OF THE INVENTION

Adhesive resin compositions of the present invention, laminates formed by using these adhesive resin compositions and processes for the preparation of these laminates will now be described.

(A) Adhesive Resin Compositions

Ethylene/vinyl acetate copolymer

The ethylene/vinyl acetate copolymer used in the present invention is a known ethylene/vinyl acetate copolymer (EVA). In general, there is used an ethylene/vinyl acetate copolymer having a melt flow rate [MFR(E), ASTM D-1238, E] of 0.1 to 50 g/10 min, preferably 1 to 30 g/10 min, and a vinyl acetate content of 5 to 40% by weight, preferably 8 to 11% by weight in case of the first adhesive resin composition or 10 to 35% by weight in case of the second adhesive resin composition. If an ethylene/vinyl acetate copolymer having MFR within the above-mentioned range is used, the melt viscosity is reduced, the moldability is improved and the adhesiveness is increased, and especially in the case of the second adhesive resin composition, the adhesiveness after a retort treatment can be further improved.

Styrene resin

The styrene polymer resin used for the second adhesive resin composition of the present invention includes not only a homopolymer of styrene but also polymers and copolymers of styrene, nuclear substitution products thereof and substitution products of styrene formed by substitution at the α-position of the double bond, such as chlorostyrene, dichlorostyrene, methylstyrene, dimethylstyrene and α-methylstyrene. In general, in the present invention, a styrene polymer resin having a melt flow rate [MFR(G), ASTM D-1238, G] of 0.1 to 50 g/10 min, preferably 1 to 40 g/10 min, is used. If a styrene polymer resin having MFR (G) within the above-mentioned range is used, an adhesive resin composition having an excellent extrusion moldability is obtained.

Graft-modified polyethylene

The graft-modified polyethylene used in the present invention is characterized in that the grafting amount of an unsaturated carboxylic acid or a derivative thereof is 0.01 to 15% by weight, preferably 0.1 to 5% by weight in case of the first adhesive resin composition or 0.1 to 10% by weight in case of the second adhesive resin composition, the melt flow rate (ASTM D-1238, condition E) is 0.1 to 50 g/10 min, preferably 0.3 to 30 g/10 min, the density is 0.900 to 0.980 g/cm$^3$, preferably 0.905 to 0.970 g/cm$^3$, and the X-ray crystalinity is at least 30%, preferably 35 to 75%.

In this graft polyethylene, the polyethylene is partially or wholly graft-modified. The graft-modified polyethylene can be a product formed by graft-modifying an ethylene/α-olefin copolymer of ethylene with a minor amount, for example, up to 5 mole %, of at least one other α-olefin selected from propylene, 1-butene, 4-methyl-1-pentene, 1-hexene, 1-octene and 1-decene.

The graft-modified polyethylene is obtained by partially or wholly graft-modifying polyethylene or an ethylene/α-olefin copolymer with an unsaturated carboxylic acid or a derivative thereof. As the unsaturated carboxylic acid and its derivative, there can be mentioned, for example, unsaturated carboxylic acids such as acrylic acid, maleic acid, fumaric acid, tetrahydrophthalic acid, itaconic acid, citraconic acid, crotonic acid, isocrotonic acid and Nadic acid ® (endocis-bicyclo[2,2,1]hept-5-ene-2,3-dicarboxylic acid), derivatives thereof such as acid halides, amides, imides, anhydrides and esters. As specific examples of the derivative, there can be mentioned malenyl chloride, maleimide, maleic anhydride, citraconic anhydride, monomethyl maleate, dimethyl maleate and glycidyl maleate. Among these compounds, an unsaturated dicarboxylic acid or its anhydride is preferably used, and maleic acid, Nadic acid ® and acid anhydrides thereof are especially preferably used.

For the production of a modification product by graft copolymerization of polyethylene with a grafting monomer selected from the above-mentioned unsaturated carboxylic acids and derivatives, various known processes can be adopted. For example, there can be adopted a process in which polyethylene is melted, the grafting monomer is added to the melt and graft polymerization is carried out, and a process in which a solution of the grafting monomer in a solvent is added and graft polymerization is carried out. In each case, in order to increase the grafting efficiency of the grafting monomer, the reaction is preferably carried out in the presence of a radical initiator. The grafting reaction is generally carried out at a temperature of 60° to 350° C. The amount used of the radical initiator is generally 0.001 to 1 part by weight per 100 parts by weight of polyethylene. As the radical initiator, there can be mentioned organic peroxides and organic peresters such as benzoly peroxide, dichlorobenzoyl peroxide, dicumyl peroxide, di-tert-butyl peroxide, 2,5-dimethyl-2,5-di(-peroxidobenzoato)hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butylperbenzoate, tert-butylperphenyl acetate, tert-butyl perisobutyrate, tert-butyl per-sec-octoate, tert-butyl perpivalate and cumyl perpivalate, and other azo compounds such as azobisisobutyrinitrile and dimethyl azoisobutyrate. Among these compounds, there are preferably used dialkyl peroxides such as di-tert-butyl peroxide, 2,5-dimethyl-2,5-di(tert-butylperoxy)-hexyne-3 and 1,4-bis(tert-butylperoxyisopropyl)benzene.

Monovinyl aromatic hydrocarbon/olefin block copolymer elastomer (styrene elastomer)

The monovinyl aromatic hydrocarbon/olefin block copolymer elastomer (styrene elastomer) is a polymer having a linear or branched block structure having a monovinyl aromatic hydrocarbon polymer block on at least one terminal thereof, which is represented by the general formula of $(A-B)_n$, $(A-B)_m A'$ or $(A-B)_m X$ wherein A and A' represent a monovinyl aromatic hydrocarbon polymer block, B represents an olefin polymer block, n is an integer of from 1 to 5, m is an integer of from 2 to 7 and X represents a polyfunctional compound having a valency of m. Styrene and α-methylstyrene are preferably used as the monovinyl aromatic hydrocarbon, and styrene is especially preferably used. As the olefin, there can be mentioned conjugated diolefins such as butadiene and isoprene, and α-olefins such as ethylene, propylene and 1-butene. The polymer block formed by polymerization of a conjugated diolefin can be hydrogenated. The block B may be composed of a copolymer of butadiene or isoprene with styrene or α-methylstyrene, so far as olefin units are contained in a major amount. In the present invention, in the monovinyl aromatic hydrocarbon/olefin block copolymer elastomer (d), the amount of the monovinyl aromatic hydrocarbon polymer blocks is generally 8 to 55% by weight and preferably 10 to 35% by weight. A block copolymer having monovinyl aromatic hydrocarbon polymer blocks on both of the terminals is preferably used. These block copolymers are marketed, for example, under tradenames of Cariflex ® TR and Kraton ® G (each being a registered trade mark for a product supplied by Shell Chemicals).

Ethylene/α-olefin copolymer

The ethylene/α-olefin copolymer used in the present invention is an ethylene/α-olefin random copolymer which is characterized in that the melt flow rate [MFR(E), ASTM D-1238, condition E] is 0.1 to 50 g/10 min, preferably 0.3 to 30 g/10 min, the density is 0.850 to 0.900 g/cm$^3$, preferably 0.850 to 0.890 g/cm$^3$, the ethylene content is 75 to 95 mole %, preferably 75 to 90 mole %, in case of the first adhesive resin composition, or 45 to 95 mole %, preferably 45 to 90 mole %, in case of the second adhesive composition, and the X-ray crystallinity is lower than 30%, preferably lower than 25%.

If an ethylene/α-olefin copolymer having the above-mentioned characteristics is used, an adhesive resin composition having an excellent adhesiveness can be obtained. Especially, in the second adhesive resin composition, the adhesiveness after a retort treatment and the adhesiveness to a polyolefin are highly improved.

An α-olefin having 3 to 20 carbon atoms is used as the α-olefin constituting this ethylene/α-olefin copolymer. As specific examples, there can be mentioned propylene, 1-butene, 1-hexene, 4-methyl-1-pentene, 1-octene, 1-decene, 1-tetradecene and 1-octadecene. These α-olefin can be used alone or in the form of a mixture of two or more of them.

The ethylene/α-olefin copolymer generally has a melting point (ASTM D-3418) lower than 100° C.

Mixing ratios

In the first adhesive resin composition of the present invention, the ethylene/vinyl acetate copolymer (a) is used in an amount of 96 to 45 parts by weight, preferably 85 to 50 parts by weight, the styrene polymer resin (b) is used in an amount of 30 to 1 parts by weight, preferably 25 to 5 parts by weight, the graft-modified polyethylene (c) is used in an amount of 15 to 1 parts by weight, preferably 10 to 2 parts by weight, the monovinyl aromatic hydrocarbon/olefin block copolymer elastomer (d) is used in an amount of 20 to 1 parts by weight, preferably 18 to 3 parts by weight, and the ethylene/α-olefin copolymer (e) is used in an amount of 20 to 1 parts by weight, 18 preferably to 3 parts by weight, per 100 parts by weight of the total amount of components (a) through (e).

In the second adhesive resin composition of the present invention, the graft-modified polyethylene is used in an amount of 1 to 30 parts by weight, preferably 2 to 28 parts by weight, per 100 parts by weight of the soft polymer.

In the first embodiment of the second adhesive resin composition, the soft polymer is a styrene elastomer.

In the second embodiment of the second adhesive resin composition, a styrene elastomer and an ethylene/α-olefin copolymer are used in combination as the soft polymer. In this case, the soft polymer comprises 20 to 100% by weight, preferably 20 to 90% by weight, of the styrene elastomer, and 0 to 80% by weight, preferably 10 to 80% by weight, of the ethylene/α-olefin copolymer, with the proviso that the total amount of the styrene elastomer and the styrene-/α-olefin copolymer is 100% by weight.

In the third embodiment of the second adhesive resin composition, a styrene elastomer and an ethylene/vinyl acetate copolymer are used in combination as the soft polymer. In this case, the soft polymer comprises 20 to 100% by weight, preferably 20 to 90% by weight, of the styrene elastomer and 0 to 80% by weight, preferably 10 to 80% by weight, of the ethylene/vinyl acetate copolymer, with the proviso that the total amount of the styrene elastomer and the ethylene/vinyl acetate copolymer is 100% by weight.

In the fourth embodiment of the second adhesive resin composition, an ethylene/α-olefin copolymer and an ethylene/vinyl acetate copolymer can be used together with the styrene elastomer as the soft polymer. In this case, the soft polymer comprises 20 to 100% by weight, preferably 20 to 90% by weight, of the styrene elastomer, 0 to 80% by weight, preferably 10 to 70% by weight of the ethylene/α-olefin copolymer, and 0 to 80% by weight, preferably 10 to 70% by weight, of the ethylene/vinyl acetate copolymer, with the proviso that the total amount of the styrene elastomer, the ethylene/α-olefin copolymer and the ethylene/vinyl acetate copolymer is 100% by weight.

The second adhesive resin composition of the present invention comprises the styrene elastomer and the graft-modified polyethylene as indispensable components, and the grafting ratio of the entire composition is 0.01 to 3% by weight, preferably 0.05 to 2.5% by weight. MFR of the total composition is 0.1 to 50 g/10 min, preferably 0.2 to 40 g/10 min, and the crystallinity of the total composition is lower than 35%.

The adhesive resin composition of the present invention is prepared by mixing the above-mentioned amounts of the above-mentioned components by known mixing means such as a Henschel mixer, a V-type blender, a ribbon blender or a tumbling blender, or by melt-kneading the above mixture by a single-screw extruder, a twin-screw extruder, a kneader or a Banbury mixer and granulating or pulverizing the melt-kneaded mixture.

Additives customarily used for thermoplastic resins, for example, a heat-resistant stabilizer, a weathering stabilizer, an antistatic agent, a lubricant, a slip agent, a nucleating agent, a dye or pigment and a plasticizer such as a hydrocarbon oil, can be added to the adhesive resin composition of the present invention, so far as the attainment of the objects of the present invention is not hindered.

(B) Laminates and Process for Preparation Thereof

In the laminate forming by using the first adhesive resin composition, the adhesive resin composition is interposed between a metal such as aluminum, copper or iron and a thermoplastic resin such as a polyamide, a saponified ethylene/vinyl acetate copolymer, polyethylene, a polycarbonate or a polyester.

This laminate can be prepared, for example, according to a process in which a film having a thickness of 10 to 200 μm is formed from the adhesive resin composition, the film is set between adherends, that is, the metal and thermoplastic resin, and fusion bonding is carried out to effect lamination, or a process in which the adhesive resin composition and the thermoplastic resin as the adherent are independently melted in different extruders and the melts are extruded through a multi-layer die to effect lamination.

The laminate formed by using the second adhesive resin composition of the present invention comprises (I) a polyalkylene terephthalate resin or polycarbonate resin layer, (II) an adhesive layer composed of the second adhesive resin composition and (III) a saponified olefin/vinyl acetate copolymer layer.

The layer (I) constituting the laminate of the present invention is composed of a member selected from a polyalkylene terephthalate resin and a polycarbonate resin.

The polyester resin used is a polyester comprising units of at least one dihydroxyl compound selected from aliphatic glycols such as ethylene glycol, propylene glycol, 1,4-butanediol, neopentyl glycol and hexamethylene glycol, alicyclic glycols such as cyclohexanedimethanol and aromatic dihydroxyl compounds such as bisphenol, and units of at least one dicarboxylic acid compound selected from aromatic dicarboxylic acids such as terephthalic acid, isophthalic acid and 2,6-naphthalene-dicarboxylic acid, aliphatic dicarboxylic acids such as oxalic acid, succinic acid, adipic acid, sebacic acid and undecanedicarboxylic acid and alicyclic dicarboxylic acids such as hexahydroterephthalic acid. The polyester can be modified with a small amount of a polyhydroxyl compound or polycarboxylic acid having a valency of at least 3, such as a triol or a tricarboxylic acid, so far as the polyester shows thermoplastic properties. As the thermoplastic polyester, there can be mentioned polyethylene terephthalate, polybutylene terephthalate and a polyethylene isophthalate/terephthalate copolymer.

The polycarbonate resin used in the present invention includes various polycarbonates and copolycarbonates obtained by reacting dihydroxyl compounds with phosgene or diphenyl carbonate according to known processes. As specific examples of the dihydroxyl compound, there can be mentioned hydroquinone, resorcinol, 4,4'-dihydroxydiphenylmethane, 4,4'-dihydroxydiphenylethane, 4,4'-dihydroxydiphenyl-n-butane, 4,4'-dihydroxydiphenylheptane, 4,4'-dihydroxydiphenylphenylmethane, 4,4'-dihydroxy-diphenyl-2,2-propane (bisphenol A), 4,4'-dihydroxy-3,3'-dimethyldiphenyl-2,2'-propane, 4,4'-dihydroxy-3,3'-diphenyldiphenyl-2,2-propane, 4,4'-dihydroxydichlorophenyl-2,2-propane, 4,4'-dihydroxydiphenyl-1,1-cyclopentane, 4,4'-dihydroxydiphenyl-1,1-cyclohexane, 4,4'-dihydroxydiphenylmethylphenylmethane, 4,4'-diphydroxydiphenylethyl-phenylmethane, 4,4'-dihydroxydiphenyl-2,2,2-trichlorol, 1-ethane, 2,2'-dihydroxydiphenyl, 2,6-dihydroxynaphthalane, 4,4'-dihydroxydiphenyl ether, 4,4'-dihydroxy-3,3'-dichlorodiphenyl ether and 4,4'-dihydroxy-2,5-diethoxyphenyl ether. Among these compounds, 4,4'-dihydroxy-diphenyl-2,2-propane (bisphenol) is preferably used, because the formed polycarbonate has excellent mechanical properties and transparency.

The above-mentioned adhesive resin composition is used for the adhesive layer (II) of the laminate of the present invention.

The layer (III) constituting the laminate of the present invention is composed of a saponified olefin/vinyl acetate copolymer. A saponified olefin/vinyl acetate copolymer may be prepared by saponifying an olefin/vinyl acetate copolymer having an olefin content of 15 to 60 mole%, preferably 25 to 50 mole%, to a saponification degree of at least 50%, preferably at least 90%. If the olefin content is within the above-mentioned range, thermal decomposition is hardly caused and melt forming can be easily performed, and the drawability, water resistance and gas permeation resistance are highly improved. If the saponification degree is higher than 50%, the gas permeation resistance is highly improved.

As the olefin to be copolymerized with vinyl acetate, there can be mentioned ethylene, propylene, 1-butene, 1-hexane, 4-methyl-1-pentene, 1-octane, 1-decene, 1 tetradecene and 1-octadecene. Among them, ethylene is especially preferably used in view of the mechanical stability and moldability.

For the preparation of the laminate of the present invention, there can be adopted, for example, a co-extrusion process in which the polyalkylene terephthalate resin or polycarbonate resin, the adhesive resin composition and the saponified olefin/vinyl acetate copolymer are melted in different extruders, the melts are supplied to a die having a three-layer structure and the melts are co-extruded so that the adhesive resin composition forms an intermediate layer, or a sandwich lamination process in which the polyalkylene terephthalate resin or polycarbonate resin and the saponified olefin/vinyl acetate copolymer are formed into layers in advance and the adhesive resin composition is melt-extruded between the two layers. In view of the interlaminer bonding force, the co-extrusion process is preferably adopted. The co-extrusion process includes a T-die method using a flat die and an inflation method using a circular die. Either a single manifold type using a black box or a multiple-manifold type can be used as the flat die. Other known dies can also be used in the inflation method.

The thickness of each layer of the laminates can be appropriately determined according to the intended use. In general, when the laminate is used as a sheet of film, it is preferred that the thickness of the polyalkyl terephthalate resin or polycarbonate resin layer be 0.02 to 5 mm, the thickness of the adhesive layer be 0.01 to 1 mm and the saponified olefin/vinyl acetate copolymer layer be 0.01 to 1 mm.

The laminate of the present invention can further have a structure of (I)/(II)/(III)/(II)/(I) in which layers (I) are arranged on both the sides, or a structure further comprising a polyolefin layer, for example, a structure of polypropylene/(II)/(III)/(II)/(I) or polyethylene/(II)/(III)/(II)/(I).

The present invention will now be described in detail with reference to the following examples that by no means limit the scope of the invention.

EXAMPLE 1

High-density polyethylene (Hizex supplied by Mitsui Petrochemical Industries, Ltd.; MFR (E)=5.5 g/10 min) was reacted with maleic anhydride to obtain graft-modified polyethylene having a maleic anhydride content of 0.5% by weight, MFR (E) of 3.0 g/10 min and a gel content lower than 0.1%.

To 5 parts by weight of the graft-modified polyethylene were added 60 parts by weight of an ethylene/vinyl acetate copolymer (vinyl acetate content=10% by weight, MFR (E)=9.0 g/10 min; hereinafter referred to as "EVA"), 20 parts by weight of polystyrene (supplied under tradename of "Denka Styrol GP200" by Denki Kagaku Kogyo, MFR (G)=25 g/10 min; hereinafter referred to as "PS"), 10 parts by weight of a polybutadiene block-hydrogenated polystyrene/polybutadiene/polystyrene block copolymer (supplied under tradename of "Krayton G1652" by Shell Chemicals, styrene content=29% by weight) and 5 parts by weight of an ethylene/propylene copolymer [MFR (E)=1.0 g/10 min, ethylene content=80 mole%, X-ray crystallinity=5%, density=0.870 g/cm$^3$], and the mixture was melt-kneaded and granulated by using an extruder provided with a Dulmage screw having a diameter of 40 mm to obtain a composition (1).

The obtained composition (1) was melted at 200° and formed into a press sheet having a thickness of 3 mm by using a compression molding machine. The physical properties (MFR and the density) of the press sheet were determined. The obtained results are shown in Table 1.

A fusion-bonding film having a thickness of 50 μm was formed from the composition (1) by using a molding machine provided with a T-die having a diameter of 30 mm, and the presence or absence of streaks on the formed film was checked. By using this fusion-bonding film, an aluminum foil was bonded to a polyethylene sheet under conditions described below to obtain a laminate.

Structure

A foil/film of composition (1)/polyethylene sheet

A foil: 200 μm in thickness, 10 mm in width and 15 cm in length

Composition (1) film: 50 μm in thickness, 25 mm in width and 15 cm in length

Polyethylene sheet: 2 mm in thickness, 25 mm in width and 15 cm in length.

Bonding Conditions

Temperature: 200° C.
Pressure: 6 kg/cm$^2$
Time: 3 minutes.

A test piece having a width of 10 mm and a length of 15 cm for measuring the bonding strength was cut out from the laminate by using a knife, and the 180° peel strength was measured at a pulling speed of 200 mm/min.

The obtained results are shown in Table 2.

EXAMPLE 2

To 5 parts by weight of the maleic anhydride-grafted high-density polyethylene used in Example 1 were added 70 parts by weight of EVA, 10 parts by weight of PS, 10 parts by weight of Krayton G and 5 parts by weight of the ethylene/propylene copolymer, and the mixture was melt-kneaded and granulated in the same manner as described in Example 1 to obtain a composition (2).

The physical properties (MFR and the density) of a press sheet of the obtained composition (2) are shown in Table 1.

In the same manner as described in Example 1, a fusion-bonding film having a thickness of 50 μm was formed from the composition (2) and the presence or absence of streaks was checked, and an aluminum foil/-polyethylene sheet laminate was obtained by using this film and the 180° peel strength was measured.

The obtained results are shown in Table 2.

EXAMPLE 3

To 10 parts by weight of the maleic anhydride-grafted high-density polyethylene used in Example 1 were added 60 parts by weight of EVA, 15 parts by weight of PS, 5 parts by weight of Krayton G and 10 parts by weight of an ethylene/propylene copolymer, and the mixture was melt-kneaded and granulated in the same manner as described in Example 1 to obtain a composition (3).

The physical properties (MFR and the density) of a press sheet of the obtained composition (3) are shown in Table 1.

In the same manner as described in Example 1, a fusion-bonding film having a thickness of 50 μm was formed from the composition (3) and the presence or absence of streaks was checked, and an aluminum foil/-polyethylene sheet laminate was obtained by using this film and the 180° peel strength was measured.

The obtained results are shown in Table 2.

EXAMPLE 4

To 5 parts by weight of the maleic anhydride-grafted high-density polyethylene used in Example 1 were added 65 parts by weight of EVA, 15 parts by weight of PS, 10 parts by weight of Krayton G and 5 parts by weight of an ethylene/butene copolymer [MFR (E)=3.5 g/10 min, ethylene content=85 mole %, crystallinity=15%, density=0.885 g/cm$^3$], and the mixture was melt-kneaded and granulated in the same manner as described in Example 1 to obtain a composition (4).

The physical properties (MFR and the density) of a press sheet of the obtained composition (4) are shown in Table 1.

In the same manner as described in Example 1, a fusion-bonding film having a thickness of 50 μm was formed from the composition (4) and the presence or absence of streaks was checked, and an aluminum foil/-polyethylene sheet laminate was obtained by using this film and the 180° peel strength was measured.

The obtained results are shown in Table 2.

COMPARATIVE EXAMPLE 1

To 5 parts by weight of the maleic anhydride-grafted high-density polyethylene used in Example 1 were added 80 parts by weight of EVA, 15 parts by weight of PS and the mixture was melt-kneaded and granulated in the same manner as described in Example 1 to obtain a composition (5).

The physical properties (MFR and the density) of a press sheet of the obtained composition (5) are shown in Table 1.

In the same manner as described in Example 1, a fusion-bonding film having a thickness of 50 μm was formed from the composition (5) and the presence or absence of streaks was checked, and an aluminum foil/-polyethylene sheet laminate was obtained by using this film and the 180° peel strength was measured.

The obtained results are shown in Table 2.

COMPARATIVE EXAMPLE 2

To 5 parts by weight of the maleic anhydride-grafted high-density polyethylene used in Example 1 were added 70 parts by weight of EVA, 15 parts by weight of PS and 10 parts by weight of Krayton G, and the mixture was melt-kneaded and granulated in the same manner as described in Example 1 to obtain a composition (6).

The physical properties (MFR and the density) of a press sheet of the obtained composition (6) are shown in Table 1.

In the same manner as described in Example 1, a fusion-bonding film having a thickness of 50 μm was formed from the composition (6) and the presence or absence of streaks was checked, and an aluminum foil/-polyethylene sheet laminate was obtained by using this film and the 180° peel strength was measured.

The obtained results are shown in Table 2.

COMPARATIVE EXAMPLE 3

To 5 parts by weight of the maleic anhydride-grafted high-density polyethylene used in Example 1 were added 70 parts by weight of EVA, 15 parts by weight of PS and 10 parts by weight of the ethylene/propylene copolymer, and the mixture was melt-kneaded and granulated in the same manner as described in Example 1 to obtain a composition (7).

The physical properties (MFR and the density) of a press sheet of the obtained composition (7) are shown in Table 1.

In the same manner as described in Example 1, a fusion-bonding film having a thickness of 50 μm was formed from the composition (7) and the presence or absence of streaks was checked, and an aluminum foil/-polyethylene sheet laminate was obtained by using this film and the 180° peel strength was measured.

The obtained results are shown in Table 2.

COMPARATIVE EXAMPLE 4

To 5 parts by weight of the maleic anhydride-grafted high-density polyethylene used in Example 1 were added 60 parts by weight of EVA, 15 parts by weight of PS, 10 parts by weight of high-density polyethylene [MFR (E)=8.2 g/10 min, density=0.965 g/cm$^3$, crystallinity=81%], and the mixture was melt-kneaded and granulated in the same manner as described in Example 1 to obtain a composition (8).

The physical properties (MFR and the density) of a press sheet of the obtained composition (8) are shown in Table 1.

In the same manner as described in Example 1, a fusion-bonding film having a thickness of 50 μm was formed from the composition (8) and the presence or absence of streaks was checked, and an aluminum foil/polyethylene sheet laminate was obtained by using this film and the 180° peel strength was measured.

The obtained results are shown in Table 2.

Sheet structure: PC/(1)/EVOH/(1)/PP.
Layer thicknesses (μm): 80/50/50/50/80.
Extruders:
40-mm screw diameter extruder, 260° C. (for PC)
30-mm screw diameter extruder, 250° C. [for (1)]
30-mm screw diameter extruder, 210° C. (for EVOH)
40-mm screw diameter extruder, 230° C. (for PP).

With respect to the obtained 5-layer sheet, the interfa-

TABLE 1

|  | Measurement Method | Example 1 | Example 2 | Example 3 | Example 4 | Comparative Example 1 | Comparative Example 2 | Comparative Example 3 | Comparative Example 4 |
|---|---|---|---|---|---|---|---|---|---|
| MFR(E) (g/10 min) | ASTM D 1238 | 5.2 | 4.5 | 6.8 | 6.4 | 7.4 | 5.2 | 5.9 | 6.5 |
| Density (g/cm$^3$) | ASTM D 1505 | 0.94 | 0.94 | 0.94 | 0.94 | 0.95 | 0.94 | 0.94 | 0.95 |
| Strain at Yield Point (kg/cm$^2$) | ASTM D 638 | — | — | — | — | 74 | — | — | 86 |
| Tensile Force at Break Point (kg/cm$^2$) | ASTM D 638 | 97 | 110 | 100 | 99 | 64 | 130 | 96 | 103 |
| Elongation (between bench marks) (%) | ASTM D 638 | 490 | 500 | 490 | 530 | 190 | 500 | 510 | 430 |
| Shore Hardness (D) | ASTM D 2240 | 48 | 45 | 46 | 49 | 48 | 44 | 43 | 48 |
| Vicat Softening Point (°C.) | ASTM D 1525 | 64 | 62 | 63 | 65 | 72 | 69 | 64 | 72 |

TABLE 2

|  | Formation of streaks | 180° Peel Strength (kg/10 mm) (bonding temperature = 200° C.) |
|---|---|---|
| Example 1 | ◯ | 5.2 |
| Example 2 | ◯ | 4.9 |
| Example 3 | ◯ | 5.2 |
| Example 4 | ◯ | 5.1 |
| Comparative Example 1 | X | 5.1 |
| Comparative Example 2 | ◯ | 3.0 |
| Comparative Example 3 | X | 4.0 |
| Comparative Example 4 | ◯ | 2.5 |

Note
◯ not observed
X observed

EXAMPLE 5

A 5-layer sheet was formed under conditions described below by using a composition (1) comprising 100 parts by weight of a styrene elastomer (Krayton G 1652 supplied by Shell Chemicals; hereinafter referred to as "SEBS") and 10 parts by weight of maleic anhydride-grafted modified polyethylene (MFR=1.0 g/10 min, density=0.925 g/cm$^3$, crystallinity=52%, butene content=3.6 mole %, maleic anhydride grafting amount=1.0 g/100 g of polymer; hereinafter referred to as "MAH-PE-1"), a polycarbonate (Panlite L-1250 supplied by Teijin Kasei; hereinafter referred to as "PC"), a saponified ethylene/vinyl acetate copolymer (Kuraray Eval EP-F supplied by Kuraray, MFR=1.3 g/10 min, density=1.19 g/cm$^3$, ethylene content=32 mole %; hereinafter referred to as "EVOH"), and polypropylene (Hipol F 401 supplied by Mitsui Petrochemical Industries, Ltd.; hereinafter referred to as "PP").

cial bonding strength (FPC, g/15 mm) between the layer of (1) and the EVOH layer and the interfacial bonding strength (FEVOH, g/15 mm) between the EVOH layer and the layer of (1) were measured at a peeling atmosphere temperature of 23° or 80° C. and a peeling speed of 300 mm/min according to the T-peel test.

The sheet was subjected to a retort treatment at 131° C. for 30 minutes. Then, the T-peel test was carried out under the same conditions as described above.

The obtained results are shown in Table 3.

EXAMPLE 6

A 5-layer sheet was obtained and the T-peel test was carried out in the same manner as described in Example 5 except that a composition (2) comprising 75 parts by weight of SEBS, 25 parts by weight of an ethylene/propylene random copolymer (MFR=1.0 g/10 min, ethylene content=80 mole %, density=0.865 g/cm$^3$, crystallinity=4%; hereinafter referred to as "EPR-1") and 10 parts by weight of MAH-PE-1 was used instead of the composition (1) used in Example 5.

The obtained results are shown in Table 3.

Then, a 5-layer sheet was formed by using the composition (2), the above-mentioned EVOH, polyethylene terephthalate (formed by adding a crystallization promoter to J135 supplied by Mitsui Pet; hereinafter referred to as "PET") and PP under conditions described below.

Sheet structure: PET/(2)/EVOH/(2)/PP.
Layer thicknesses (μm): 80/50/50/50/80.
Extruders:
40-mm screw diameter extruder, 280° C. (for PET)
30-mm screw diameter extruder, 250° C. (for (2))

30-mm screw diameter extruder, 210° C. (for EVOH)
40-mm screw diameter extruder, 230° C. (for PP).

With respect to the obtained sheet, the interfacial bonding strength (FPET, g/15 mm) between the PET layer and the layer of (2) and the interfacial bonding strength (FEVOH, g/15 mm) between the EVOH layer and the layer of (2) were measured under the same conditions as described above with respect to PC.

The obtained results are shown in Table 4.

EXAMPLE 7

A 5-layer sheet was obtained and the T-peel test was carried out in the same manner as described in Example 6 except that a composition (3) comprising 80 parts by weight of SEBS, 20 parts by weight of an ethylene/vinyl acetate copolymer (MFR=2.5 g/10 min, vinyl acetate content=25% by weight; hereinafter referred to as "EVA-1") and 10 parts by weight of MAH-PE-1 was used instead of the composition (2) used in Example 6.

The obtained results are shown in Tables 3 and 4.

EXAMPLE 8

A 5-layer sheet was obtained and the T-peel test was carried out in the same manner as described in Example 6 except that a composition (4) comprising 40 parts by weight of SEBS, 45 parts by weight of an ethylene/1-butene random copolymer (MFR=3.5 g/10 min, ethylene content=89 mole %, density=0.885 g/cm$^3$, crystallinity=15%; hereinafter referred to as "EBR-1"), 15 parts by weight of EVA-1 and 20 parts by weight of MAH-PE-1 was used instead of the composition (2) used in Example 6.

The obtained results are shown in Tables 3 and 4.

EXAMPLE 9

A 5-layer sheet was obtained and the T-peel test was carried out in the same manner as described in Example 5 except that a composition (5) comprising 20 parts by weight of SEBS, 60 parts by weight of EBR-1, 20 parts by weight of EVA-1 and 10 parts by weight of MAH-PE-1 was used instead of the composition (1) used in Example 5.

The obtained results are shown in Table 3.

EXAMPLE 10

A 5-layer sheet was obtained and the T-peel test was carried out in the same manner as described in Example 5 except that a composition (6) comprising 60 parts by weight of SEBS, 20 parts by weight of EBR-1, 20 parts by weight of EVA-1 and 10 parts by weight of MAH-PE-1 was used instead of the composition (1) used in Example 5.

The obtained results are shown in Table 3.

COMPARATIVE EXAMPLE 5

A 5-layer sheet was obtained and the T-peel test was carried out in the same manner as described in Example 5 except that a composition (7) comprising 100 parts by weight of EBR-1 and 10 parts by weight of MAH-PE-1 was used instead of the composition (1) used in Example 5.

The obtained results are shown in Table 3.

COMPARATIVE EXAMPLE 6

A 5-layer sheet was obtained and the T-peel test was carried out in the same manner as described in Example 5 except that a composition (8) comprising 85 parts by weight of EBR-1, 15 parts by weight of EVA-1 and 10 parts by weight of MAH-PE-1 was used instead of the composition (1) used in Example 5.

The obtained results are shown in Table 3.

COMPARATIVE EXAMPLE 7

A 5-layer sheet was obtained and the T-peel test was carried out in the same manner as described in Example 5 except that a composition (9) comprising 40 parts by weight of SEBS, 45 parts by weight of EBR-1 and 15 parts by weight of EVA-1 was used instead of the composition (1) used in Example 5.

The obtained results are shown in Table 3.

TABLE 3

| | Recipe (parts by weight) of Adhesive Resin Composition | | PC/EVOH Multi Layer Sheet | | | | | |
|---|---|---|---|---|---|---|---|---|
| | | | FPC (g/15 mm width) | | | FEVOH (g/15 mm width) | | |
| | | | 23° C. atmosphere | 80° C. atmosphere | 23° C. atmosphere after retort treatment | 23° C. atmosphere | 80° C. atmosphere | 23° C. atmosphere after retort treatment |
| Example 5 | SEBS | 100 | 940 | 920 | 390 | 690 | 630 | 350 |
| | MAH-PE-1 | 10 | | | | | | |
| Example 6 | SEBS | 75 | 1250 | 930 | 860 | 830 | 720 | 790 |
| | EPR-1 | 25 | | | | | | |
| | MAH-PE-1 | 10 | | | | | | |
| Example 7 | SEBS | 80 | 1190 | 1010 | 750 | 450 | 410 | 440 |
| | EVA-1 | 20 | | | | | | |
| | MAH-PE-1 | 10 | | | | | | |
| Example 8 | SEBS | 40 | 860 | 440 | 590 | 450 | 400 | 440 |
| | EBR-1 | 45 | | | | | | |
| | EVA-1 | 15 | | | | | | |
| | MAH-PE-1 | 20 | | | | | | |
| Example 9 | SEBS | 20 | 690 | 350 | 810 | 520 | 370 | 500 |
| | EBR-1 | 60 | | | | | | |
| | EVA-1 | 20 | | | | | | |
| | MAH-PE-1 | 10 | | | | | | |
| Example 10 | SEBS | 60 | 830 | 670 | 570 | 390 | 320 | 410 |
| | EBR-1 | 20 | | | | | | |
| | EVA-1 | 20 | | | | | | |
| | MAH-PE-1 | 10 | | | | | | |
| Comparative Example 5 | EBR-1 | 100 | 910 | 180 | 110 | 1300 | 210 | 1030 |
| | MAH-PE-1 | 10 | | | | | | |
| Comparative Example 6 | EBR-1 | 85 | 1600 | 120 | 1390 | 460 | 170 | 450 |
| | EVA-1 | 15 | | | | | | |
| | MAH-PE-1 | 10 | | | | | | |
| Comparative | SEBS | 40 | 750 | 610 | 430 | 90 | 50 | 10 |

TABLE 3-continued

| | Recipe (parts by weight) of Adhesive Resin Composition | | PC/EVOH Multi Layer Sheet | | | | | |
|---|---|---|---|---|---|---|---|---|
| | | | FPC (g/15 mm width) | | | FEVOH (g/15 mm width) | | |
| | | | 23° C. atmosphere | 80° C. atmosphere | 23° C. atmosphere after retort treatment | 23° C. atmosphere | 80° C. atmosphere | 23° C. atmosphere after retort treatment |
| Example 7 | EBR-1 | 45 | | | | | | |
| | EVA-1 | 40 | | | | | | |

TABLE 4

| | Recipe (parts by weight) of Adhesive Resin Composition | | PET/EVOH Multi-Layer Sheet | | | | | |
|---|---|---|---|---|---|---|---|---|
| | | | FPET (g/15 mm width) | | | FEVOH (g/15 mm width) | | |
| | | | 23° C. atmosphere | 80° C. atmosphere | 23° C. atmosphere after retort treatment | 23° C. atmosphere | 80° C. atmosphere | 23° C. atmosphere after retort treatment |
| Example 6 | SEBS | 75 | 960 | 890 | 880 | 810 | 700 | 800 |
| | EPR-1 | 25 | | | | | | |
| | MAH-PE-1 | 10 | | | | | | |
| Example 7 | SEBS | 80 | 840 | 320 | 730 | 460 | 420 | 410 |
| | EVA-1 | 20 | | | | | | |
| | MAH-PE-1 | 10 | | | | | | |
| Example 8 | SEBS | 40 | 520 | 380 | 510 | 460 | 390 | 430 |
| | EBR-1 | 45 | | | | | | |
| | EVA-1 | 15 | | | | | | |
| | MAH-PE-1 | 20 | | | | | | |

In Examples 5 through 10 and Comparative Examples 5 through 7, the crystallinity and density were measured according to the following procedures.

(1) Preparation of Sample

The sheet was heated at 180° C. by a hot press for 10 minutes and was rapidly cooled by a cooling press (water cooling) to prepare a sample.

(2) Crystallinity

The crystallinity of the sample obtained in (1) above was determined by the X-ray diffractometry.

(3) Density

The density of the sample was measured at 23° C. according to the density gradient tube method.

As is apparent from the results of the foregoing examples, since the first adhesive resin composition comprises (a) an ethylene/vinyl acetate copolymer, (b) a styrene polymer resin, (c) graft-modified polyethylene, (d) a monovinyl aromatic hydrocarbon/olefin block copolymer elastomer and (e) an ethylene/α-olefin copolymer at a specific ratio, streaks are not formed at the extrusion molding, and a fusion-bonding (adhesive) film having a good appearance is obtained. Furthermore, the adhesive resin composition of the present invention can give an excellent adhesiveness between a metal and a thermoplastic resin sheath layer.

Accordingly, the adhesive resin composition of the present invention can be suitably used as a melt adhesive for laminates of laminate sheath cables and films of various packaging materials.

When the second adhesive composition of the present invention is used for bonding (I) a layer of a polyalkylene terephthalate resin or polycarbonate resin and (III) a layer of a saponified olefin/vinyl acetate copolymer, the layers (I) and (III) can be so tightly bonded that peeling of the layers (I) and (III) is not caused even under high-temperature conditions as adopted for a high-temperature filling treatment or a retort treatment, and a practically sufficient bonding strength can be maintained at normal temperature after this high-temperature treatment.

Accordingly, a laminate comprising the layers (I) and (III) bonded by using the adhesive resin composition of the present invention has a high resistance to permeation of gases such as oxygen and therefore, the laminate has excellent properties as a retortable food packaging material.

We claim:

1. A laminate structure useable as a retortable packaging material comprising (I) a layer of a polyalkylene terephthalate resin or a polycarbonate resin, (III) a saponified olefin/vinyl acetate copolymer layer, and interposed therebetween (II) a layer of an adhesive resin composition, said adhesive resin composition comprising 100 parts by weight of a soft polymer and 1 to 30 parts by weight of partially or wholly graft-modified polyethylene which has a melt flow rate (ASTM D-1238, condition E) of from 0.1 to 50 g/10 min, a density of 0.900 to 0.980 g/cm$^3$, and an X-ray crystallinity of at least 30%, and in which the graft monomer is an unsaturated carboxylic acid or a derivative thereof, and wherein the amount of the graft monomer is 0.05 to 15% by weight, wherein the soft polymer comprises (a) 20 to 90 parts by weight of a styrene/ethylene-butene/styrene block copolymer elastomer having styrene polymer blocks on both of the terminals of the polymer molecule, and (b) 80 to 10 parts by weight of an ethylene/α-olefin copolymer having an ethylene content of 45 to 95 mole %, a melt flow rate (ASTM D-1238, condition E) of from 0.1 to 50 g/10 min, a density of from 0.850 to 0.900 g/cm$^3$ and an X-ray crystallinity of lower than 30%.

2. The laminate structure of claim 1 wherein the graft-modified polyethylene has a melt flow rate (ASTM D-1238, condition E) of from 0.3 to 30 g/10 min, a density of 0.905 to 0.970 g/cm$^3$, and an X-ray crystallinity of at least 35 to 75%, said ethylene/α-olefin copolymer having a melt flow rate (ASTM D-1238, condition E) of from 0.3 to 30 g/10 min, a density of from 0.850 to 0.890 g/cm$^3$, and an X-ray crystallinity of lower than 25%.

3. A laminate structure useable as a retortable packaging material comprising (I) a layer of a polyalkylene terephthalate resin or a polycarbonate resin, (III) a saponified olefin/vinyl acetate copolymer layer, and interposed therebetween (II) a layer of an adhesive resin composition, said adhesive resin composition comprising 100 parts by weight of a soft polymer and 1 to 30 parts by weight of a partially or wholly graft-modified polyethylene which has a melt flow rate (ASTM D-1238, condition E) of from 0.1 to 50 g/10 min, a density of 0.900 to 0.980 g/cm$^3$, and an X-ray crystallinity of at least 30%, and in which the graft monomer is an unsaturated carboxylic acid or derivative thereof, and the amount of the monomer is 0.05 to 15% by weight, wherein the soft polymer comprises (a) 20 to 80 parts by weight of a styrene/ethylene-butene/styrene block copolymer elastomer having styrene polymer blocks on both of the terminals of the polymer molecule, (b) 10 to 70 parts by weight of an ethylene/α-olefin copolymer having an ethylene content of 45 to 95 mole %, a melt flow rate (ASTM D-1238, condition E) of from 0.1 to 50 g/10 min, a density of from 0.850 to 0.900 g/cm$^3$ and an X-ray crystallinity lower than 30%, and (c) 10 to 70 parts by weight of an ethylene/vinyl acetate copolymer having a vinyl acetate content of 5 to 40% by weight.

4. A laminate structure useable as a retortable packaging material comprising a metal layer, a thermoplastic resin layer, and interposed therebetween a layer of an adhesive resin composition, said adhesive resin composition comprising (a) 96 to 45 parts by weight of an ethylene/vinyl acetate copolymer, (b) 30 to 1 parts by weight of a styrene polymer resin, (c) 15 to 1 parts by weight of polyethylene graft-modified with an unsaturated carboxylic acid or a derivative thereof, (d) 20 to 1 parts by weight of a monovinyl aromatic hydrocarbon/olefin block copolymer elastomer and (e) an ethylene/α-olefin copolymer having an ethylene content of 45 to 95 mole %, a melt flow rate (ASTM D-1238, condition E) of from 0.1 to 50 g/10 min, a density of from 0.850 to 0.900 g/cm$^3$ and an X-ray crystallinity of lower than 30%, the total amount of components (a), (b), (c), (d), and (e) being 100 parts by weight.

5. The laminate structure of claim 4 wherein said adhesive resin composition comprises (a) 80 to 50 parts by weight of said ethylene/vinyl acetate copolymer, (b) 25 to 5 parts by weight of said styrene polymer resin, (c) 10 to 2 parts by weight of said polyethylene graft-modified with an unsaturated carboxylic acid or a derivative thereof, (d) 18 to 3 parts by weight of said block copolymer elastomer which is a polybutadiene block-hydrogenated polystyrene/polybutadiene/polystyrene block copolymer elastomer and (e) 18 to 3 parts by weight of said ethylene/α-olefin random copolymer, wherein the ethylene content is 75 to 95 mole %, the total amount of components (a), (b), (c), (d) and (e) being 100 parts by weight.

6. The laminate structure of claim 5 which comprises (a) 60 to 70 parts by weight of the ethylene/vinyl acetate copolymer, (b) 10 to 20 parts by weight of the styrene polymer resin, (c) 5 to 10 parts by weight of the graft-modified polyethylene, (d) 5 to 10 parts by weight of the block copolymer elastomer, and (e) 5 to 10 parts by weight of the ethylene/α-olefin random copolymer.

* * * * *